No. 627,675. Patented June 27, 1899.
O. & O. B. ZWIETUSCH.
FILTER.
(Application filed Dec. 16, 1898.)

(No Model.)

Witnesses:
Chas. E. Gaylord,
Luter B. Alter.

Inventors:
Otto Zwietusch,
Oscar B. Zwietusch,
By Dyrenforth & Dyrenforth,
Attys.

THE NORRIS PETERS CO., PHOTO-LITHO., WASHINGTON, D. C.

UNITED STATES PATENT OFFICE.

OTTO ZWIETUSCH AND OSCAR B. ZWIETUSCH, OF MILWAUKEE, WISCONSIN.

FILTER.

SPECIFICATION forming part of Letters Patent No. 627,675, dated June 27, 1899.

Application filed December 16, 1898. Serial No. 699,428. (No model.)

*To all whom it may concern:*

Be it known that we, OTTO ZWIETUSCH and OSCAR B. ZWIETUSCH, citizens of the United States, residing at Milwaukee, in the county of Milwaukee and State of Wisconsin, have invented a new and useful Improvement in Filters, of which the following is a specification.

The object of our invention is to construct a filter for all the usual purposes—that is to say, for the filtration of liquids such as wine, beer, and water—with a filtering capacity greater than that of ordinary filters of the same dimensions and which at the same time shall be simple and durable.

The nature of our improvements will be understood from the following description, reference being had to the accompanying drawing, of which—

Figure 1:
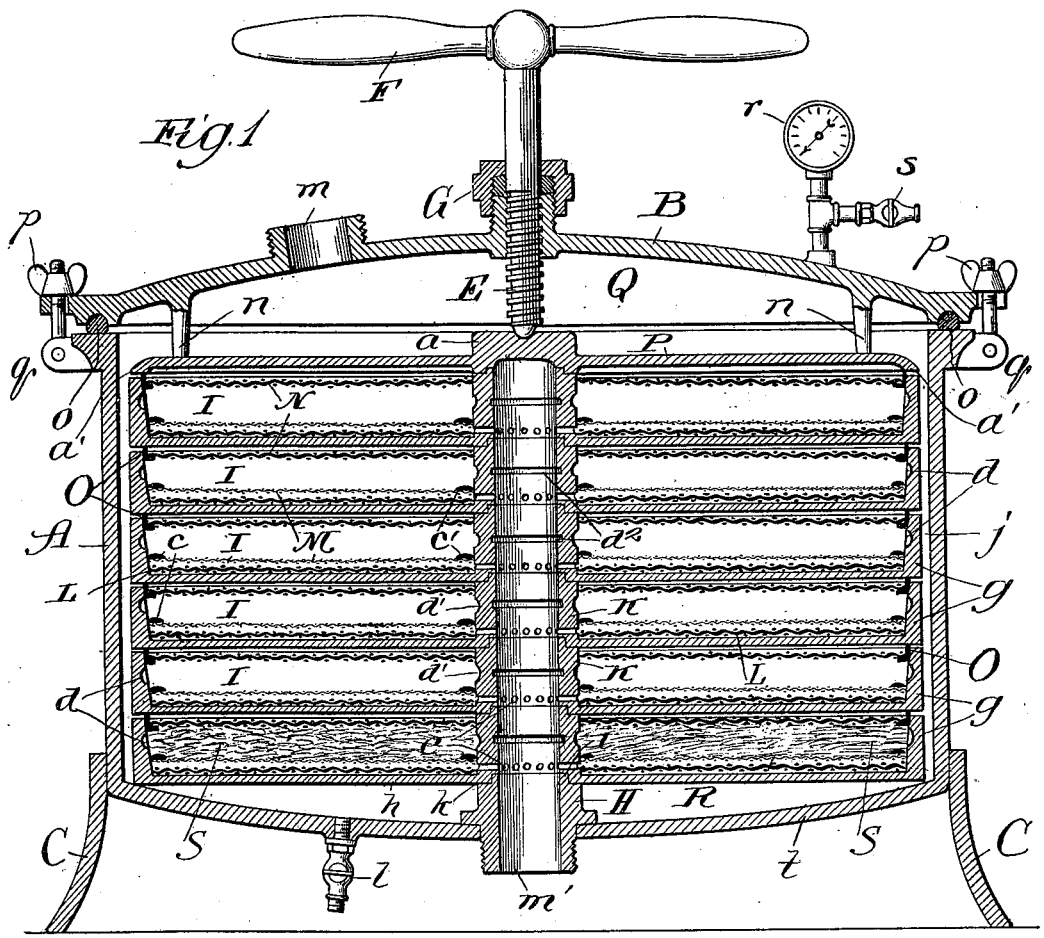
Figure 2:
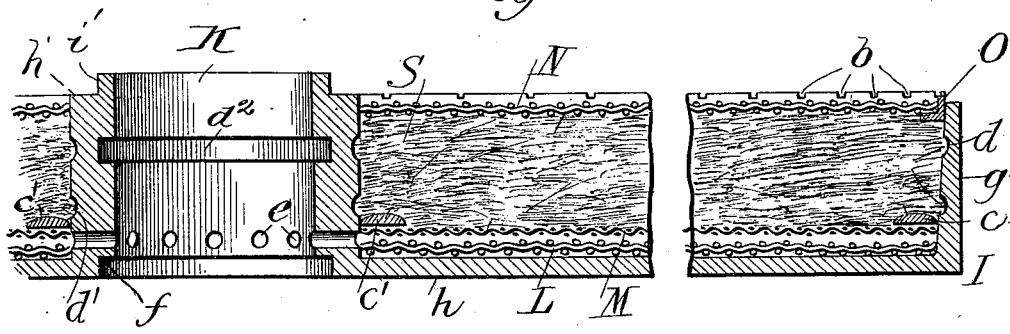

Figure 1 is a central vertical section of our filter complete, and Fig. 2 an enlarged broken central vertical section of a portion of one of the filtering-pans with its appurtenances.

The filter consists of a cylindrical upright body A, having a dish-shaped bottom $t$ and a removable cover B. Secured to the lower end of the cylinder is a supporting-rim C to rest evenly upon the floor.

B is a cover for the shell, made concavo-convex in form, like the bottom $t$. It is provided toward one side with a vent-cock $s$ and pressure-gage $r$ and is secured to the upper edge of the shell by means of swinging screw-bolts $q$, with fly-nuts $p$, in the usual manner. Interposed between the cover and the upper edge of the shell is an annular rubber packing $o$, the cover being suitably recessed to receive it. Upon the under side of the cover are posts $n$ in any suitable number, the purpose of which will be explained hereinafter. The inlet for the liquid is by way of the nipple $m$ toward one side of the cover and the outlet by way of the nipple $m'$ at the center of the bottom. Each nipple is externally threaded for the attachment of hose. The bottom is further provided at one side of the center with a drainage-cock $l$.

At the center of the cover and extending through the same is a pressure-screw E, operated by a handle F. The cover is provided on its upper side with a bushing G, which is provided with a packing in the usual way to prevent leakage. This and the packing $o$ between the cover and the upper edge of the shell constitute the only packings employed in the entire filter. Upon the inner side of the bottom $t$ and integral therewith is a tubular extension H in vertical line with the outlet $m'$ and provided toward its upper edge with an offset to form a shoulder $k$ in the plane of the inner periphery of the bottom and a short vertical cylindrical neck $i$ above the shoulder.

I I are a series of annular pans somewhat less in external diameter than the interior diameter of the shell and having a smooth level bottom $h$, to leave a narrow annular space $j$ between the sides of the pans and the inner wall of the shell, and an upward-extending rim $g$, which is vertical on its outer surface, but may be made more or less flaring on its inner surface. It will be observed that in the construction of our pans all ribs and other irregularities upon the exterior surface are avoided. The central part of this pan is a somewhat massive tube K, having at its lower end an annular socket $f$ and at its upper end a shoulder $h'$ and short vertical neck $i'$, corresponding with the shoulder and neck on the tubular piece H. Thus when the pans are placed one upon another within the shell the socket $f$ in the lowermost pan fits over the offset at the upper end of the tubular piece H, the socket of the next pan fits over the offset at the upper end of the central tubular part of the first pan, and so on throughout the series, whereby when all the pans are in place a firm central tubular column is produced. Just above the socket $f$ of the tubular central portion of each pan is a series of openings $e$, by means of which the interior of the annular pan communicates with the vertical central outlet, and in the interior of the rim $g$ and upon the exterior of the central tubular portion of each pan is one or more annular grooves $d$ and $d'$, the purpose of which will be hereinafter described. Upon the interior of each central tube K is an annular groove $d^2$, the function of which is to permit the pan to be lifted out of the shell by means of an inserted spring instrument which enters the groove. The construction of the pans is such that the plane of the upper edge of the rim $g$ is a little lower than that of the shoulder $h'$, so that a narrow space intervenes between the top of each rim and the bottom of the pan immediately above it.

L is a coarse annular mat of woven wire lying directly upon the bottom of each pan and is about one-eighth of an inch in thickness, whereby it extends upward to a plane about even with the holes $e$. M is a strong fine woven-wire sieve covering the entire annular interior of the pan and reinforced at its inner and outer margins by plano-convex annular plates $c$ and $c'$, firmly secured to it. The space within the pan above the sieve M receives the filter mass S, which is pressed into place.

Experience has demonstrated that the liquid undergoing filtration has a tendency to pass through too easily at the edges of the filter mass, so that such portions as pass through there are insufficiently filtered. The object of the grooves $d$ and $d'$ is to overcome this defect by forcing the liquid to take an irregular course around the edges of the filter mass.

The filter mass which we prefer to employ is that shown, described, and claimed in Letters Patent of the United States No. 398,110, granted to Otto Zwietusch February 19, 1889; but other filtering materials may be employed, if desired.

N is a coarse annular woven-wire mat fitting within the pan above the filter mass, and it is inserted after the filter mass has been pressed into place. It is reinforced at its outer edge by an angular metal rim O, the vertical part of which fits closely within the upper edge of the rim $g$ of the pan and projects above the top of the rim into contact with the bottom of the next pan above. It is provided with a series of notches $b$ in its upper edge to permit the liquid to pass into the narrow space which intervenes between the woven-wire mat N and the bottom of the next pan above.

P is a circular disk thickened at its center, as shown at $a$, where it bears upon the central tubular column, and provided with a bead upon the under side of its margin, as shown at $a'$, where it comes into contact with the notched rim O of the uppermost woven-wire mat N. The function of the posts $n$, hereinbefore described, is to bear upon the disk P when the cover is secured in place, and thus hold the margin of the disk in close contact with the upper edge of the adjacent rim O.

All the principal parts of the filter—that is to say, the shell, the cover, the pans, and the disk P—are made of brass or copper; but when employed for wine it is advisable that the entire interior, including the pans, be silver-plated. As adapting the pans to be silver-plated the smooth and even character of their surfaces is of great importance.

To prepare the filter for operation, the pans are introduced successively, each being packed with filtering mass and provided with its covering of woven-wire mat N before insertion. The pans having all been introduced, the disk P is inserted, and thereupon the cover is put in place and firmly secured. The turning of the screw causes it to bear upon the disk P and press the sections of the central tubular column close together. The liquid to be filtered enters into the upper chamber Q at the top of the filter and thence passes into the narrow marginal chamber $j$, whence it finds its way through the notches $b$ in the rims O into the narrow horizontal chambers which intervene between the pans, and thence through the mat N, the filtering mass below it, and sieve M into the meshes of the lowermost mat L, through which it finds its way back and forth in an undulating horizontal course to the openings $e$, thence to the interior of the central vertical column, and finally to the outlet $m'$. More or less of the liquid may find its way around the edge of the lowermost pan into the bottom chamber R of the filter, and this may be drained off through the cock $l$, which may also be employed to drain off water when the filter is washed.

The inlet and outlet pipes connected with the filter, but which are not shown, should be provided, as usual, with cocks near the body of the filter to regulate or stop the flow of the liquid and also for permitting the cleansing of the filtering material when required. The cleansing is done by connecting an adequate water-pressure to the outlet, so that the water may flow back through the filtering mass and out at the inlet-opening.

The function of the air-cock $s$ is to let off air and gases, as may be required, from the interior of the filter, and the function of the pressure-gage $r$ is to indicate the pressure at which the filtering is progressing in the case of charged liquids.

It will be seen that the construction of our filter is exceptionally simple and that we avoid the use of the usual perforated copper bottoms, extra sieves, layers of fabric, rubber packings, and separating-ribs. In the construction of our filter everything is avoided which could be injurious to the product and which is not absolutely necessary to perfect efficiency, and this has been one of the leading objects of our invention. In addition to this we have sought to produce the largest possible filtering capacity for filters of any given dimensions, and this also we deem to have been fully accomplished by the construction herein shown and described.

What we claim as new, and desire to secure by Letters Patent, is—

1. In a filter, the combination with a circular shell having a bottom provided with a central outlet-opening, and a tubular interior extension H, of a series of annular pans superimposed one upon another within the shell, each less in extreme diameter than the interior diameter of the shell, and having openings near its bottom through the inner wall of the annulus, a disk P bearing upon and closing the tubular column formed by the inner walls of the annular pans, and annular woven-wire sieves within the pans to embrace and operate in conjunction with the filtering mass employed therein, substantially as described.

2. In a filter, the combination with the cylinder A, bottom $t$ having the drainage-cock $l$ and central outlet-opening $m'$, of the central interior extension H provided with an offset $k$ $i$ at its upper end, removable cover B having an inlet $m$, a central pressure-screw, an air-vent and pressure-gage, and interior downward-extending posts $n$, a series of annular pans superposed one upon another within the shell, and less in extreme diameter than the interior of the shell, whereby an annular space $j$ intervenes, the central tube of each pan being provided at its lower end with a socket $f$ and an offset at its upper end, corresponding with that upon the tubular extension H, adapted to fit the socket in the next pan above, and having openings $e$ from the interior of the pan, an annular coarse woven-wire mat L in the bottom of each pan, a fine annular woven-wire sieve M, resting upon the mat L, and a coarse woven-wire annular mat N, to bear upon the filtering mass within the pan, and having the marginal notched angle-plate O, and the disk P engaged by the pressure-screw in the cover, and bearing at its center upon the tubular outlet-column formed by the annular pans, and at its margin upon the notched rim O of the uppermost pan, substantially as described.

3. An annular filtering-pan, comprising a smooth bottom $h$, an internally-grooved peripheral rim $g$, and a central tubular externally-grooved wall K having an internal groove $d^2$, an offset $h'$ $i'$ at one end, a socket $f$ at the other end, and holes $e$ extending through it from the interior of the pan, substantially as described.

4. In a filter, in combination with the shell having an inlet at its top and a central outlet at its bottom, a series of annular pans to receive the filtering agents, of smaller diameter than the interior of the shell, and each having its inner wall K provided with holes $e$, for the escape of the filtrate, and with an offset at one end and a corresponding socket at the other, whereby, when the pans are superimposed one upon another, the offset of one enters the socket of the adjacent one, forming a continuous central conduit to the discharge-opening, and a seal for closing the upper end of the conduit, substantially as described.

5. A filtering-pan, annular in form, comprising a smooth bottom, an internally-grooved rim and central externally-grooved tube having openings through it near the bottom of the pan, and having an offset $h'$ $i'$ at one end and a corresponding socket $f$ at the other end, in combination with a mat L upon the smooth bottom, filtering-sieve M upon the mat L and upper mat N having the notched angular extension O, substantially as described.

6. The filtering-pan I, annular in form, and having its inner wall K provided with the recess $f$ at its lower end to form a socket, horizontal openings $e$ above the recess, and offset at its upper end forming the shoulder $h'$ and neck $i'$, the plane of the top of the rim $g$ of the pan being lower than the plane of the shoulder $h'$, substantially as described.

OTTO ZWIETUSCH.
OSCAR B. ZWIETUSCH.

In presence of—
D. W. LEE,
R. T. SPENCER.